US011377978B2

(12) United States Patent
Beaujard et al.

(10) Patent No.: US 11,377,978 B2
(45) Date of Patent: Jul. 5, 2022

(54) DEVICE FOR EVACUATION OF A VENTILATED LUBRICATED CHAMBER OF A TURBOMACHINE

(71) Applicant: SAFRAN AIRCRAFT ENGINES, Paris (FR)

(72) Inventors: Antoine Jean-Philippe Beaujard, Moissy-Cramayel (FR); Fabien Roger Gaston Caty, Moissy-Cramayel (FR); Paco Maurer, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 266 days.

(21) Appl. No.: 16/778,643

(22) Filed: Jan. 31, 2020

(65) Prior Publication Data

US 2020/0248587 A1 Aug. 6, 2020

(30) Foreign Application Priority Data

Feb. 1, 2019 (FR) ...................... 19 01006

(51) Int. Cl.
*F01D 25/18* (2006.01)
*F02C 7/06* (2006.01)

(52) U.S. Cl.
CPC ................ *F01D 25/18* (2013.01); *F02C 7/06* (2013.01); *F05D 2240/55* (2013.01); *F05D 2260/608* (2013.01); *F05D 2260/98* (2013.01)

(58) Field of Classification Search
CPC ........ F01D 25/18; F01D 25/183; F01D 9/065; F02C 7/06; F05D 2240/55; F05D 2260/608; F05D 2260/98; F05D 2260/605; F05D 2260/609
See application file for complete search history.

(56) References Cited

U.S. PATENT DOCUMENTS

| | | | |
|---|---|---|---|
| 4,755,103 A | 7/1988 | Streifinger | |
| 8,826,637 B2 | 9/2014 | Thies et al. | |
| 2002/0166317 A1* | 11/2002 | Przytulski | F01D 25/125 60/39.08 |
| 2010/0028127 A1* | 2/2010 | Cornet | F01D 25/20 415/1 |
| 2011/0146223 A1 | 6/2011 | Thies | |
| 2015/0099450 A1* | 4/2015 | Dupont | F01D 25/14 454/252 |
| 2017/0306846 A1* | 10/2017 | Laing | F02C 7/00 |
| 2019/0120082 A1* | 4/2019 | Zebian | F02C 7/18 |

FOREIGN PATENT DOCUMENTS

| | | |
|---|---|---|
| EP | 1255024 A2 | 11/2002 |
| EP | 1933077 A1 | 6/2008 |
| EP | 3406862 A1 | 11/2018 |

OTHER PUBLICATIONS

Preliminary Search Report issued in French Patent Application No. 1901006 dated Oct. 11, 2019.

* cited by examiner

*Primary Examiner* — Devon C Kramer
*Assistant Examiner* — Kelsey L Stanek
(74) *Attorney, Agent, or Firm* — Pearne & Gordon LLP

(57) ABSTRACT

A ventilated chamber (19), subject to an irruption of air at a pressure higher than that in a surrounding chamber (20) through labyrinth seals separating them and evacuation of excess air through an evacuation duct (30), comprises a motor-driven compressor (32) in the evacuation duct to facilitate suction and evacuation, even when the engine speed does not allow a large overpressure in the chamber (20).

9 Claims, 2 Drawing Sheets

DEVICE FOR EVACUATION OF A VENTILATED LUBRICATED CHAMBER OF A TURBOMACHINE

This application claims priority from French Patent Application 1901006 filed Feb. 1, 2019, the entire content of which is incorporated by reference herein.

The subject of the invention is a device for evacuation of a ventilated lubricated chamber of a turbomachine.

Chambers known as ventilated chambers are of the type shown in FIG. 1 and can be used, among other purposes, for lubricating shaft rotational guide roller bearings for turbomachine providing propulsion power for aircraft. The chamber 1 comprises a wall 2 surrounding a support bearing 3 for a rotating shaft 4 and coming out of the chamber 1 through two openings 5 in the wall 2, each equipped with a seal 6. The chamber 1 is located on a lubrication circuit 7 shown only diagrammatically herein, that comprises an upper connector 8 through the wall 2 through which lubrication oil for bearing 3 is brought into the chamber 1, a lower connector 9 through the wall 2 through which excess oil is removed from the chamber 1, and a pump 10 for circulation.

It is often advantageous for the seals 6 to be labyrinth seals, in other words frictionless seals composed of opposite reliefs creating reductions in section leading to pressure differentials through them. These pressure differentials are large and make leaks more difficult, but do not eliminate them entirely. Dissemination of oil outside the chamber 1 should be avoided to prevent a number of disadvantages, such as carbonisation or the risk of fire on a hot zone of the engine, pollution of the engine and its surroundings, excessive consumption of oil, bearing lubrication defects or the formation of a liquid unbalanced mass. An external chamber 11 surrounding the chamber 1 containing the bearing 3 is then pressurised, so as to force a pressurised air flow into this chamber 1 through the seals 6 and thus avoid oil leaks in the inverse direction. The chamber 1 is then provided with an additional opening 12 that connects it to a duct 13 for evacuation of excess air, typically opening up into the external atmosphere and that comprises a deoiler 14 to intercept the oily content in suspension in the evacuated air and return it to the lubrication circuit 7.

The pressure in the external chamber 11 is normally produced by drawing off air originating from the turbomachine compressors. This compressed air is drawn off from the main flow, useful to improve the efficiency of the machine, and therefore reduces the thrust that it produces. It is also found that pressurisation of the external chamber 11 is insufficient in some states of the engine or in some circumstances. Confinement of oil may then no longer be guaranteed, and in this case a jet blower 15 can be added to the device downstream from the evacuation duct 13, so as to produce suction of the atmosphere in the chamber 13. Operation of the jet blower 15 is controlled by a valve 16 that enables or interrupts engine air circulation, originating from a take-off point 17 downstream from that or those take-off points 18 used to pressurise the external chamber 11. The valve 16 is opened when pressurisation of the external chamber 11 becomes insufficient. The jet blower 15 is supplied and creates a negative pressure in the evacuation duct 13, that reinforces suction from the chamber 1 to compensate for the low pressurisation of the external chamber 11 and therefore to maintain a sufficient pressure difference through the seals 6. But this improvement itself has some disadvantages. Since the valve 7 operates in all or nothing, without any intermediate states, it is impossible to avoid shocks during operation. Drawing off additional air also reduces the engine efficiency, and it is still necessary to use the main drawing off through the take-off point(s) 18. To be efficient, suction by the jet blower 15 imposes some sizing constraints: it may thus be necessary to increase the radius of the evacuation duct 13 to reduce pressure losses in it, thus increasing the size. The pneumatic supply circuit for the jet blower 15 itself introduces layout difficulties Finally, the device is not always efficient, for example at low engine speeds at the beginning of start-up or when idling, when the jet pump 15 is not very active.

The invention was designed to replace the existing design described above and to eliminate its disadvantages. In a general form, it relates to a device for evacuation of a ventilated lubricated chamber of a turbomachine, said device comprising a ventilation duct connecting the chamber to an ambient environment around the turbomachine, comprising a motor-driven compressor in the duct, creating a negative pressure in the duct and suction from the chamber, characterised in that the ventilation duct is a central tube coaxial with the rotation axis of a turbomachine rotor and rigidly fixed to the rotor.

The motor-driven compressor can be a small volume device that imposes fewer layout constraints for the machine than the jet blower, since it can be controlled by means of a single electrical wire, smaller than a pneumatic circuit, leading to a control device external to the engine. Control can be variable between the stopped state and the full speed of the electric motor, therefore with intermediate states. The main flow of the turbomachine is disturbed less due to the omission of drawing off at point 17. There is considerable freedom for the design of the device, that is independent from the remainder of the turbomachine. And suction can be achieved even if the radius of the evacuation duct is small.

Advantageously, the motor-driven compressor is then installed in front of one end close to the ambient environment of said central tube, connected to said end through a rotating seal, and coaxial with said rotation axis.

The central tube can be included in a low pressure shaft belonging to the rotor of the turbomachine. Finally, it is also advantageous if the motor-driven compressor is housed in a hollow of a tail cone forming part of a stator of the turbomachine, to which it is connected by a support.

The invention will now be described in more detail with reference to the following figures that represent a purely illustrative embodiment, given to clearly show its characteristics, advantages and aspects.

FIG. 1, already described, represents a device according to prior art;

Figure 1:
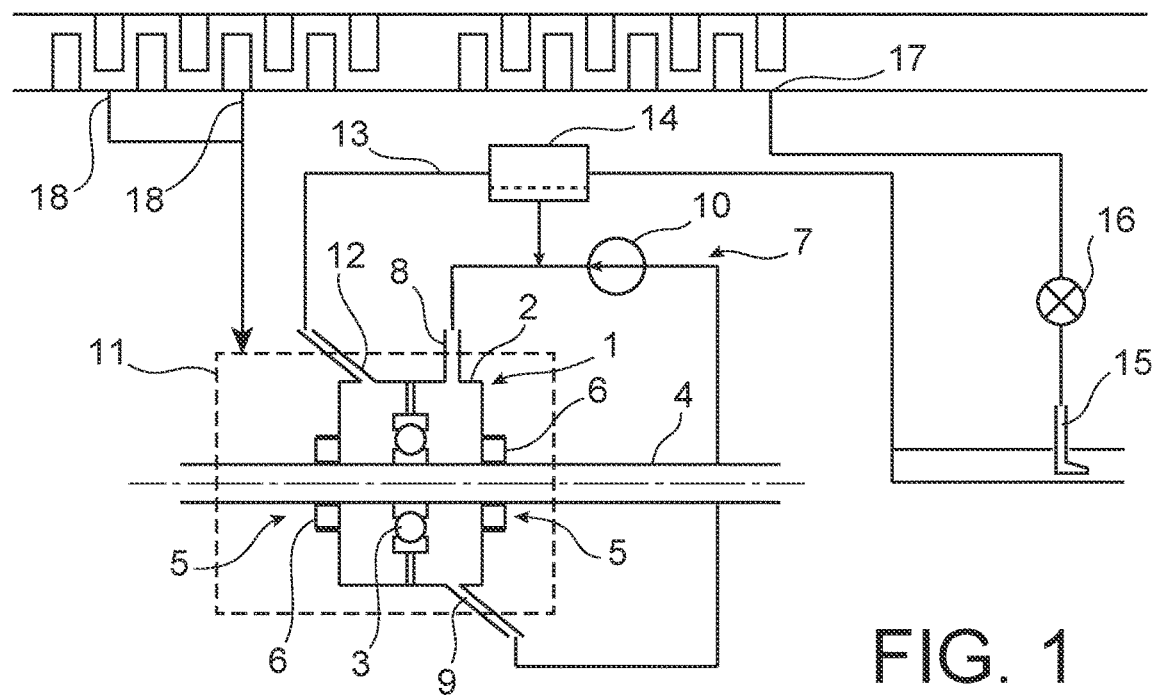
Figure 2:
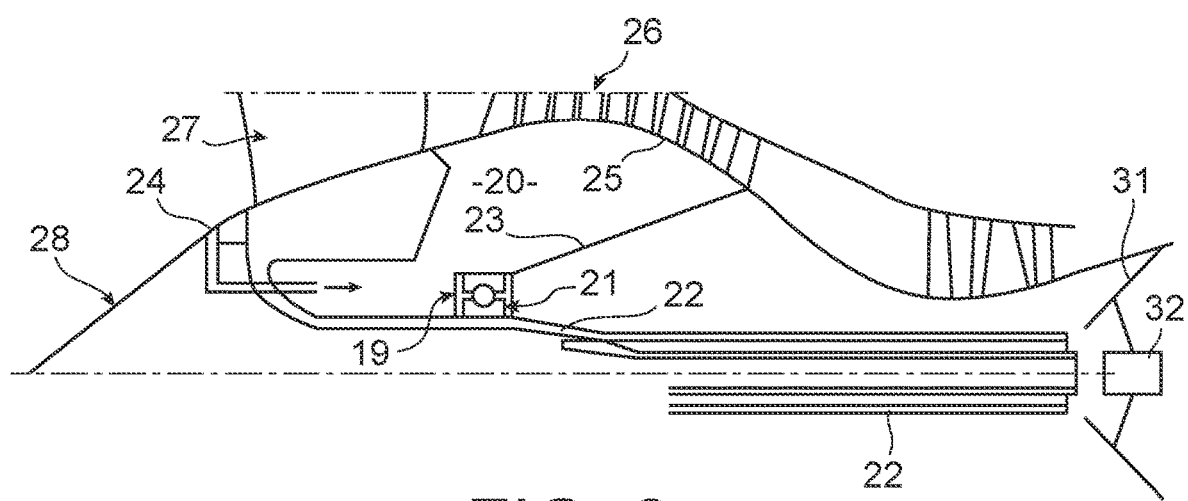
FIG. 2 is an overview of the device according to the invention.

We will now give the commentary for FIG. 2.

The chamber containing the roller bearing or more generally the lubricated bearing block is now marked as reference 19, and the external chamber reference 20. In this case, the roller bearing 21 contained in the chamber 19 is located between a low pressure shaft 22 and a stator 23 of the turbomachine. Air can be drawn off from the external chamber 20 at two drawing off points 24 and 25, as in the previous design; however, it should be noted that with the device according to the invention, pressurisation of the external chamber 20 can be lower, particularly in some embodiments in which it is continuously active and therefore applies a permanent suction on the chamber 19, the furthest upstream drawing off point 24 can be brought forwards to draw off air that is less compressed, and it can even be located forward from the compressors 26 and possibly the fan 27 of the turbomachine, and draws off ambient air on a nose cone 28. The flow in the flowstream 29 of the turbomachine will be less disturbed, and the loss of efficiency will be lower.

The evacuation duct carrying oily air outside the chamber 19 is a central vent tube 30 located inside the low pressure shaft 22, close to the X axis of the turboengine. It extends downstream from the turbomachine as far as a tail cone 31 in which the motor-driven compressor 32 characterising the invention is housed. The tail cone 31 concerned is hollow in this case, in other words it is tapered towards the forward end of the turbomachine and the aircraft, forming a concave shape aft from its structure, that opens up to the exterior. The motor-driven compressor 32 is precisely housed in this concave shape.

Figure 3:
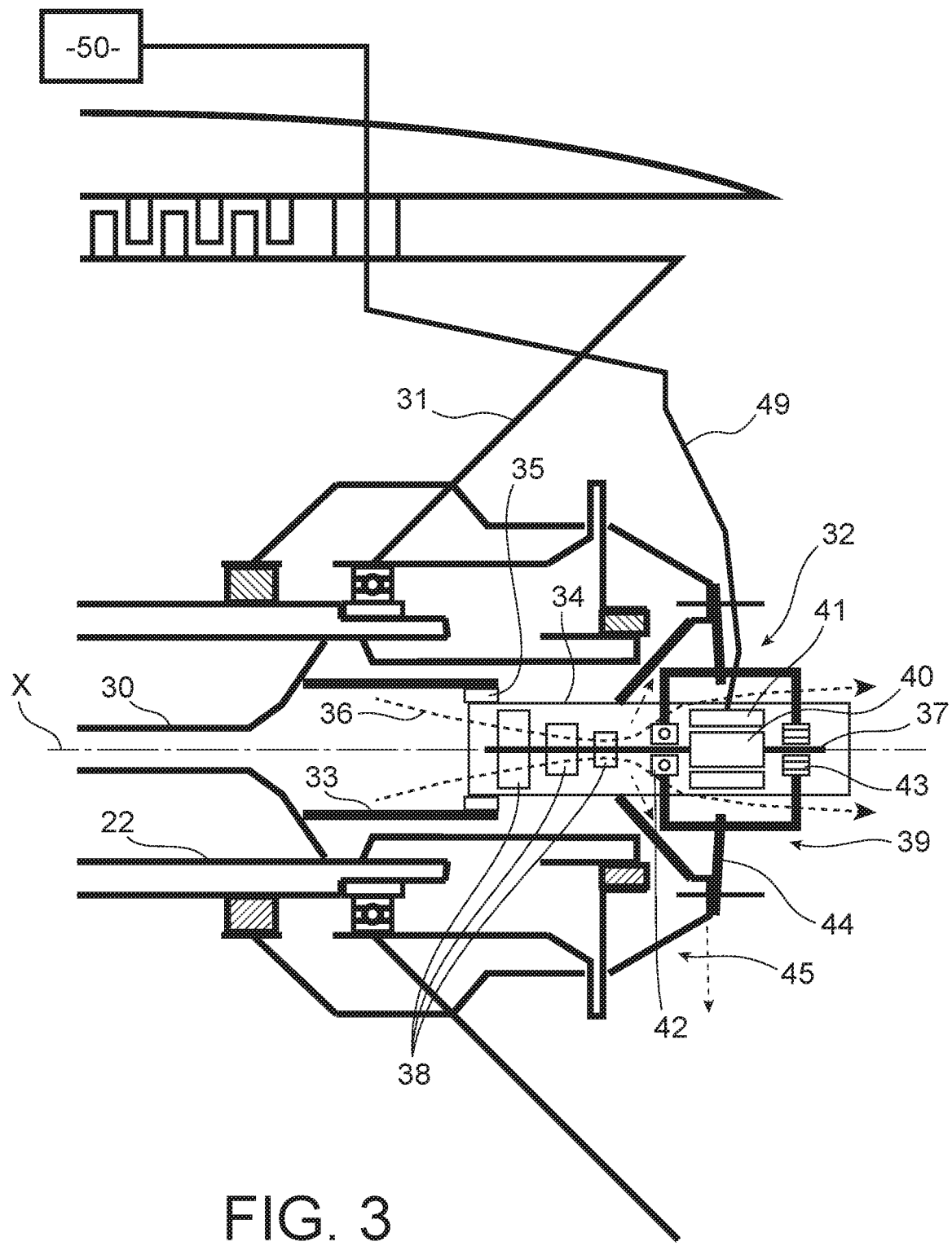
FIG. 3 is a detailed view of the motor-driven compressor and its surroundings.

Refer to FIG. 3. The central vent tube 30 comprises an aft sleeve 33 into the end of which a box 34 of the motor-driven compressor 32 penetrates; a rotating seal is intercalated between them.

The motor-driven compressor 32 comprises an air circulation flowstream 36 and a rotating shaft 37 of the motor-driven compressor 32, coaxial with the X axis of the turbomachine. The flowstream 36 extends from one end of the box 34 to the other and therefore creates a communication between the inside of the vent tube 30 and the exterior of the turbomachine. The motor-driven compressor 32 is divided into a compression part composed of one or several compression stages 8 at stages along the rotating shaft 37, and an electric motor 39. The compression stages 38 classically comprise rotor shafts rotating with the rotating shaft 37 and that can alternate with fixed blades rigidly attached to the box 34, the flowstream 36 being conical in the downstream direction, becoming narrower from one compression stage 38 to the next. The electric motor 39 is located behind the compression stages 38 and the flowstream 36 becomes wider at the location of the electric motor to house it; the flowstream 36 bypasses the electric motor 39. It comprises a ferromagnetic core 40 mounted on the rotating shaft 37 and coils 41 surrounding it and rigidly attached to the box 34. The coils 41 are powered by an electric cable 49 that can have a portion external to the tail cone 31, and thermally insulated if another portion has to pass in front of hot portions of the turbomachine, along a radial arm of the turbine that, for example, passes through the flowstream. The electric cable 49 leads to a control device 50 that can be external to the turbomachine. A ball bearing 42 and a roller bearing 43 support the rotating shaft 37 through the box 34 on each side of the electric motor 39. They are housed in grease boxes and therefore do not require a lubrication circuit. The box 34 comprises a circular external collar 44 between roller bearings 42 and 43 through which it is clamped to a support portion 45 belonging to the tail cone 31.

The device may be provided with an arbitrary number of compression stages 38. These carry an axial flow, which is not essential but is appreciable to reduce the radial dimension of the device; centrifuge compression stages would be possible. The directly integrated device held coaxial with the central vent tube 30 by the rotating seal 35 thus results in better compactness.

The electric motor 39 may operate permanently or intermittently, particularly depending on the speed of the turbomachine, or the flight phase of the aircraft in the case in which the turbomachine provides propulsion for an aircraft. The device 50 normally provides automatic control, in accordance with the indications from the various sensors of the turbomachine or the aircraft. The rotation speed of the rotating shaft 37 can be chosen freely within an allowable operating range, and therefore the suction produced in the central evacuation duct 30 can be finely adjusted.

By placing the motor-driven compressor 32 in the hollow part of the tail cone 31, there is no real increase in the footprint, particularly along the X axis.

The invention claimed is:

1. A device for evacuation of a ventilated lubricated chamber of a turbomachine, said device comprising a ventilation duct connecting the ventilated lubricated chamber to an ambient environment around the turbomachine, comprising a motor-driven compressor, creating a negative pressure differential in the ventilation duct and suction from the ventilated lubricated chamber, wherein the ventilation duct is a central tube coaxial with a rotation axis of a turbomachine rotor and rigidly fixed to said turbomachine rotor, wherein the motor-driven compressor is at least partly received in said central tube.

2. The device for evacuation of the ventilated lubricated chamber according to claim 1, wherein the motor-driven compressor is installed in one end close to the ambient environment of said central tube, and is connected to said one end through a rotating seal, and is coaxial with said rotation axis.

3. The device for evacuation of the ventilated lubricated chamber according to claim 2, wherein the central tube is included in a low pressure shaft belonging to the rotor of the turbomachine.

4. The device for evacuation of the ventilated lubricated chamber according to claim 3, wherein the motor-driven compressor is housed in a hollow of a tail cone forming part of a stator of the turbomachine, and to which it is connected by a support.

5. The device for evacuation of the ventilated lubricated chamber according to claim 4, wherein the motor-driven compressor comprises a circular collar clamped to the support.

6. The device for evacuation of the ventilated lubricated chamber according to claim 1, wherein the motor-driven compressor comprises at least one compressor stage and an electric motor controlled by an electric cable leading to a control device external to the turbomachine.

7. The device for evacuation of the ventilated lubricated chamber according to claim 1, wherein the motor-driven compressor comprises at least one compression stage with axial flow.

8. A turbomachine, comprising a ventilated lubricated chamber, and a device for evacuation of the ventilated lubricated chamber according to claim 1.

9. The turbomachine according to claim 8, further comprising an air take-off point leading to a pressurised chamber surrounding the ventilated lubricated chamber, said take-off point being located upstream from turbomachine compressors, upstream from an inlet fan, said air take-off point drawing air being at ambient pressure.

* * * * *